United States Patent [19]

Riley

[11] Patent Number: 4,517,959

[45] Date of Patent: May 21, 1985

[54] JACKETED SOLAR HOT WATER SYSTEM

[75] Inventor: Harry J. Riley, Wembley, Australia

[73] Assignee: S. W. Hart & Co. Pty Ltd., Welshpool, Australia

[21] Appl. No.: 426,382

[22] Filed: Sep. 29, 1982

[30] Foreign Application Priority Data

Mar. 10, 1982 [AU] Australia .................. PF3048

[51] Int. Cl.³ .............................................. F24J 3/02
[52] U.S. Cl. ................................... 126/437; 126/435; 126/450; 126/451
[58] Field of Search .............. 126/437, 435, 426, 417, 126/450, 434, 451; 165/488, 168–170, 154

[56] References Cited

U.S. PATENT DOCUMENTS

| | | | |
|---|---|---|---|
| 4,084,578 | 4/1978 | Ishibashi | 126/437 X |
| 4,153,043 | 5/1979 | Goolsby | 126/437 X |
| 4,165,735 | 8/1979 | Smith | 126/437 |
| 4,169,461 | 10/1979 | Haug et al. | 126/437 |

FOREIGN PATENT DOCUMENTS

| | | | |
|---|---|---|---|
| 11324 | 2/1978 | Japan | 126/434 |
| 162370 | 12/1981 | Japan | 126/437 |

*Primary Examiner*—Larry Jones
*Attorney, Agent, or Firm*—Pollock, Vande Sande & Priddy

[57] ABSTRACT

Tank assembly for a solar hot water system comprising a solar collector for containing a working fluid. The assembly comprises a cylindrical tank provided with a water inlet and a water outlet, a jacket in the form of an annular sealed envelope having inner and outer major walls and at least partly enclosing the cylindrical tank and the jacket defining an enclosed space which is also arranged to contain the working fluid. There is a closed fluid circuit between the collector and the enclosed space.

The present invention also provides a solar hot water system using the tank assembly of the invention.

The use of the tank assembly of the present invention reduces the possibility of working fluid contaminating potable water in the tank.

7 Claims, 6 Drawing Figures

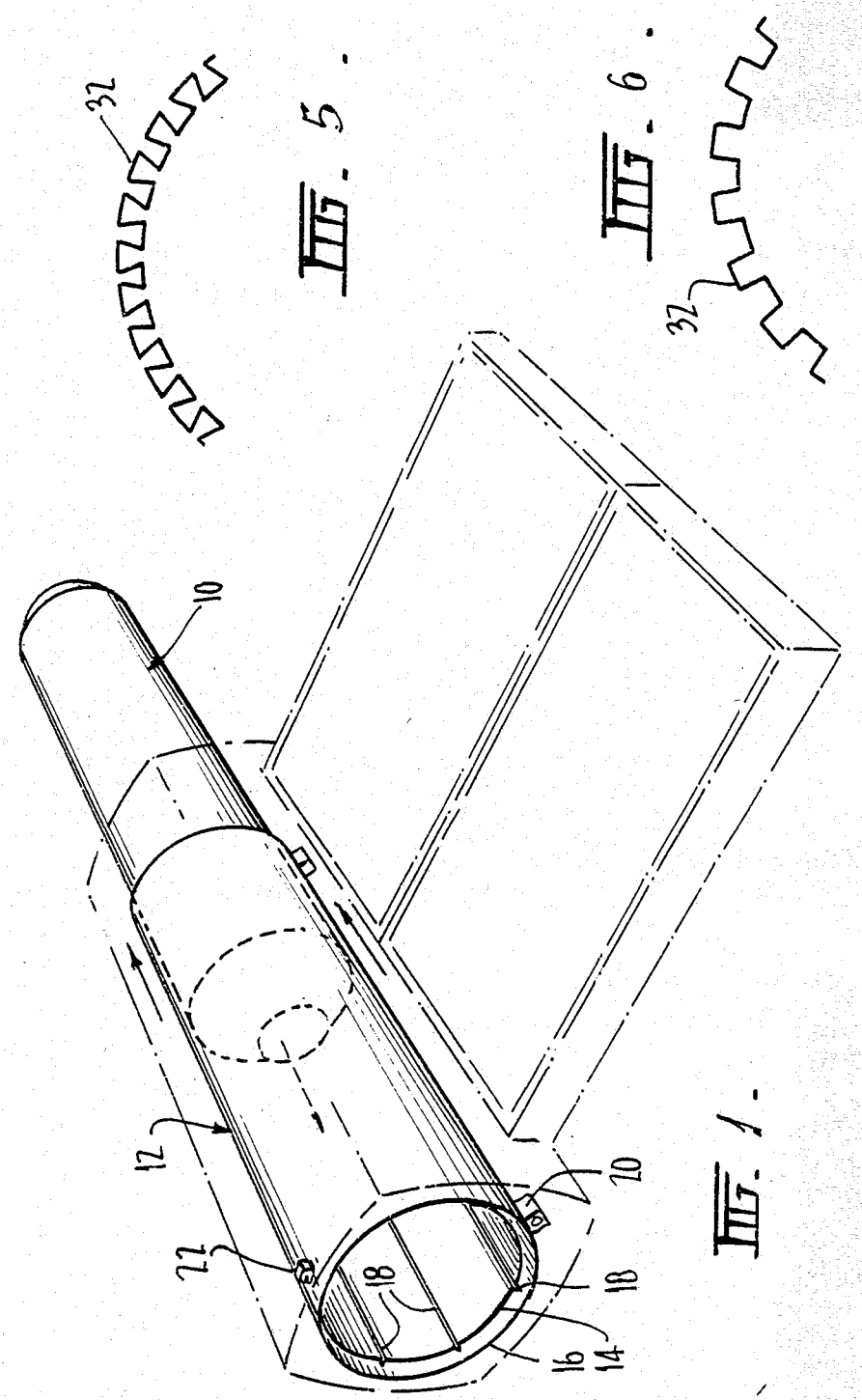

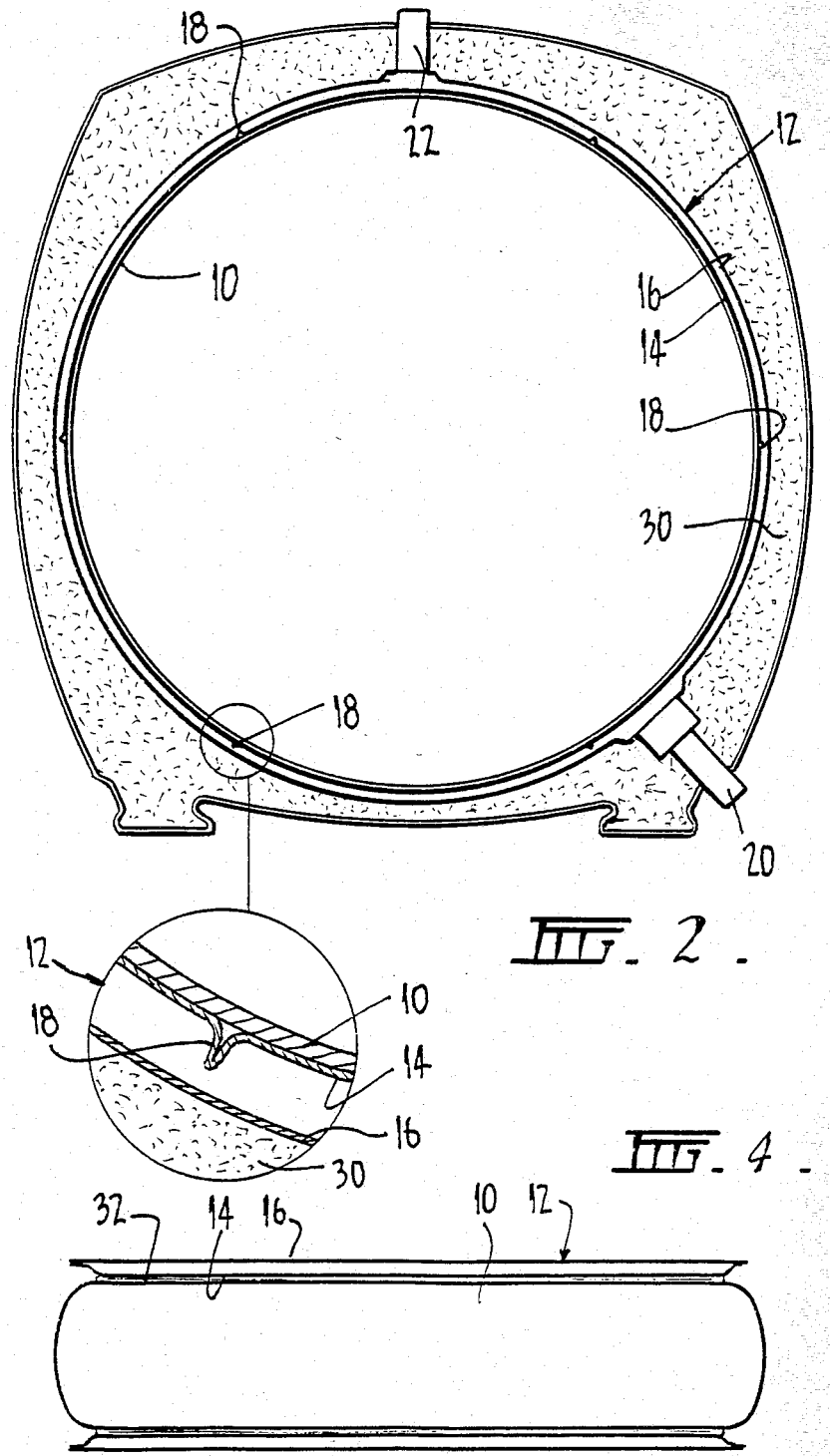

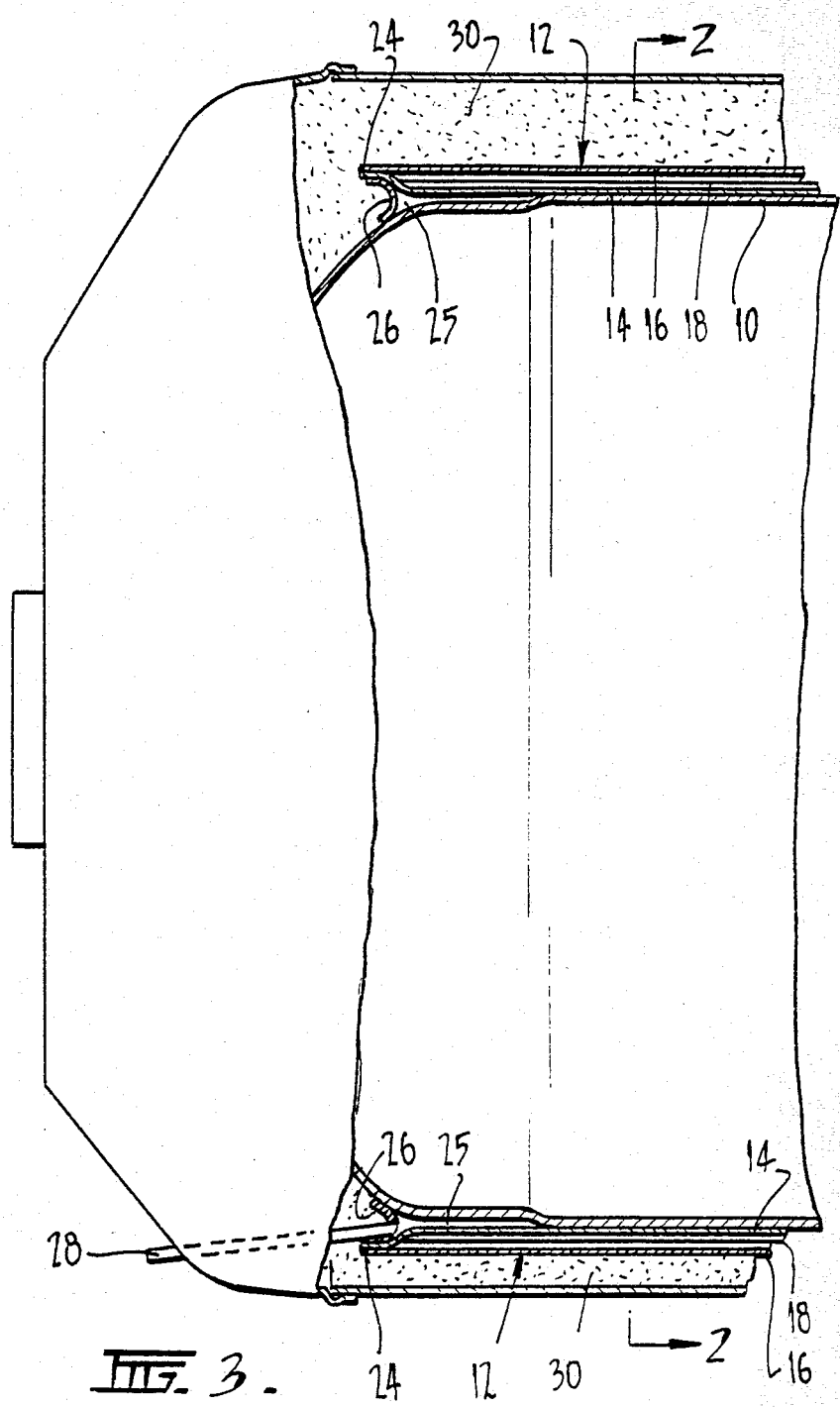

JACKETED SOLAR HOT WATER SYSTEM

The present invention relates to a jacketed solar hot water system.

Solar hot water systems typically comprise a water storage tank and a collector. The tank and collector are interconnected so that heated water can flow from the collector to the tank and cool water can flow from the tank to the collector.

In many solar hot water systems, there is a flow of water directly between the body of the tank and the collector, and water heated in the collector is actually used by the consumer. This has the disadvantage that the available water supply must be circulated through the collector; this can cause corrosion or fouling and may damage the collector on freezing.

To overcome the problem, it has been proposed to enclose the water storage tank with a jacket which is in fluid communication with the collector. Thus, the fluid which is heated in the collector circulates only through the jacket and does not enter the main body of the tank. Heat from the fluid passes into the potable water in the tank. There is in this system more flexibility in the types of fluid which can be used in the collector.

However, there is a problem with a single wall heat exchange system in that there is a risk that non-potable fluids in the jacket may contaminate potable water in the tank.

It has now been found that it is possible to obtain a satisfactory degree of heat exchange and to avoid contamination problems by the use of a double wall system while avoiding the contamination problems referred to above.

In accordance with one embodiment of the present invention, there is provided a solar hot water system comprising a solar collector arranged to contain a working fluid, a cylindrical tank provided with water inlet and water outlet means and being arranged to contain water to be heated, a jacket in the form of an annular sealed envelope having inner and outer major walls, said envelope enclosing at least in part the cylindrical tank and the jacket defining an enclosed space which is also arranged to contain the working fluid, and there being a closed fluid circuit between the collector and the enclosed space.

In accordance with a further embodiment of the present invention, there is also provided a tank assembly for a solar hot water system which comprises a solar collector arranged to contain a working fluid, said tank assembly comprising a cylindrical tank provided with water inlet and water outlet means and being arranged to contain water to be heated, a jacket in the form of an annular sealed envelope having inner and outer major walls, said envelope enclosing at least in part the cylindrical tank and the jacket defining an enclosed space which is also arranged to contain the working fluid, and the envelope further comprising means for forming a closed fluid circuit with the collector.

The present invention will now be described by way of example, with reference to the accompanying drawings, in which:

FIG. 1 is a schematic perspective view of a jacketed water storage tank of a solar hot water system showing a method of assembly;

FIG. 2 is a transverse sectional view to an enlarged scale along the line 2—2 of FIG. 3 through the assembled jacketed tank of FIG. 1;

FIG. 3 is a longitudinal sectional view to an enlarged scale through a part of the assembly of FIGS. 1 and 2;

FIG. 4 is a schematic longitudinal section through a modified form of the jacketed water storage tank of FIGS. 1 to 3;

FIG. 5 is a schematic, partial end elevation of a heat conductive fin according to one profile used in the assembly of FIG. 4; and FIG. 6 is a view similar to FIG. 5 of a fin which an alternative profile.

In FIGS. 1, 2 and 3, there is shown a cylindrical water storage tank 10 having end walls.

There is also shown a sealed metal annular envelope 12. The envelope 12 comprises inner and outer cylindrical major walls 14 and 16. The cylindrical walls 14 and 16 are separated by a small distance such as about 6 mm.

Conveniently, the inner major wall 14 and the outer major wall 16 are made from a cylinder of the same diameter. The inner wall is then reduced in diameter by forming therein a series of longitudinal flutes 18.

The envelope 12 contains connection points 20 to enable it to be connected to a solar collector and is also provided with a vent 22 (see FIG. 1).

As can be seen in FIG. 1, the apparatus may be conveniently assembled by covering the outer surface of a fully fabricated tank 10 with a heat transfer paste and sliding a fully assembled envelope 12 onto the tank 10 as shown by the arrows. Preferably, the envelope 12 is heat shrunk onto the tank 10.

As can be seen in FIG. 3, the corresponding ends of walls 14 and 16 are shaped so as to contact one another. The contracting ends are then seam welded at 24 so as to form a fluid tight joint that forms a sealed envelope.

As can be seen in FIG. 3, the tank 10 has domed ends which are preferably of slightly smaller diameter than the major portion of the tank so as to leave a partial air space 25 around the tank 10.

Conveniently, the ends of the cylindrical portion of the tank 10 are turned inwardly slightly as shown in FIG. 3 so that the domed ends can be butt welded to the cylindrical portion.

It is necessary that the said air space be sealed and vented to atmosphere. As shown in FIG. 3, this may be done by inserting an annular seal 26 in the gap between the end of the inner wall 14 and the tank 10 and passing a vent pipe 28 through the seal 26. The vent pipe 28 passes to atmosphere. In conventional manner the tank and jacket assembly is surrounded by insulating material 30 such as polyurethane insulating material.

It is found that the partial air gap 25 may not be considered as providing an adequate air gap between the envelope 12 and the tank 10.

If a complete gap is required it will be necessary to provide means for conducting heat across the gap.

In FIGS. 4 to 6, there is shown a modification of the present invention in which an annular highly heat conductive metal fin 32 typically composed of aluminum is interposed between the envelope 12 and tank 10. The fin 32 can have any suitable profile but preferably comprises a series of projections with intervening depressions. The fin 32 can be formed from light gauge aluminum sheet folded into a series of projections and depressions and then wrapped around the curved surface of the cylindrical tank 10. As shown in FIGS. 5 and 6, the projections and depressions may be in the form of truncated isosceles triangles (FIG. 5) or rectangles (FIG. 6).

The envelope may then be heat shrunk on to the fin 32 similar to the method of assembly described above in relation to FIG. 1. This forms a tight mechanical bond aluminum to envelope, and aluminum to tank. Hence, heat is conducted across the gap between the tank 10 and envelope 14 by the metal fin 32.

Modifications and variations such as would be apparent to a skilled addressee are deemed within the scope of the present invention. For example, instead of in or in addition to making the tank ends of smaller diameters to form the air space 25, the ends of the inner wall 14 could be flared outwardly.

I claim:

1. A tank assembly for a solar hot water system comprising a solar collector for containing a working fluid, said tank assembly comprising
    (a) a cylindrical tank having water inlet and outlet means for containing water to be heated;
    (b) a jacket in the form of an annular sealed envelope having inner and outer major walls, said jacket at least partly enclosing said cylindrical tank and defining an enclosed space for also containing said working fluid;
    (c) means arranged to form a closed fluid circuit between said collector and said enclosed space; and
    (d) an annular air gap adjacent each end of said envelope between said inner wall thereof and said tank, said air gap being sealed by an annular seal and being vented to atmosphere.

2. A tank assembly according to claim 1, wherein said inner and outer major walls are formed from cylindrical members of the same diameter, said inner wall being formed with a plurality of spaced, parallel, longitudinally extending flutes to reduce its effective overall diameter.

3. A tank assembly according to claim 1 or 2, wherein corresponding ends of said inner and outer major walls are shaped so that they contact one another and the ends of the envelope are closed by seam welding the contacting ends of said major walls.

4. A tank assembly according to claim 1, comprising an annular highly heat conductive fin interposed between said tank and said envelope.

5. A tank assembly according to claim 4, wherein said fin comprises a series of projections with intervening depressions.

6. A tank assembly according to claim 1, wherein said tank has end walls.

7. A solar hot water system incorporating the tank assembly as claimed in any one of claims 1, 2 and 4 to 6.

* * * * *